Feb. 1, 1955

G. W. MILLER 2,700,925

WEEDER IMPLEMENT

Filed Nov. 23, 1951

INVENTOR
GUSTAVE W. MILLER

BY
McMorrow, Berman & Davidson
ATTORNEYS

2,700,925

WEEDER IMPLEMENT

Gustave W. Miller, Biloxi, Miss.

Application November 23, 1951, Serial No. 257,869

1 Claim. (Cl. 97—212)

This invention relates to weeding implements, and more particularly, has reference to a weeding implement adapted to be drawn by a tractor or similar vehicle, and formed to a star shape, the implement being particularly adapted to weed row crops between the plants of a single row.

One important object of the present invention is to provide an improved weeder falling within the general category referred to, that is adapted to be constructed at relatively low cost, and which can be attached readily to or detached from a tractor draw bar or the like, with speed and ease.

Another important object is to provide an implement as stated which includes a rotatable body adapted to be rotated in a generally horizontal plane, said body having radial projections particularly adapted to weed between the plants of a row.

Yet another important object is to provide a weeding implement as stated wherein there will be embodied a depth regulator particularly adapted for adjusting the extent of penetration of the weed engaging portions of the device.

Still another important object is to provide an implement of the type stated which will be universally mounted upon a supporting frame, for adjustment to selected angles of inclination relative to the ground surface over which it is drawn.

Other objects will appear from the following description, the claim appended thereto, and from the annexed drawing, in which like reference characters designate like parts throughout the several views, and wherein:

Figure 1:
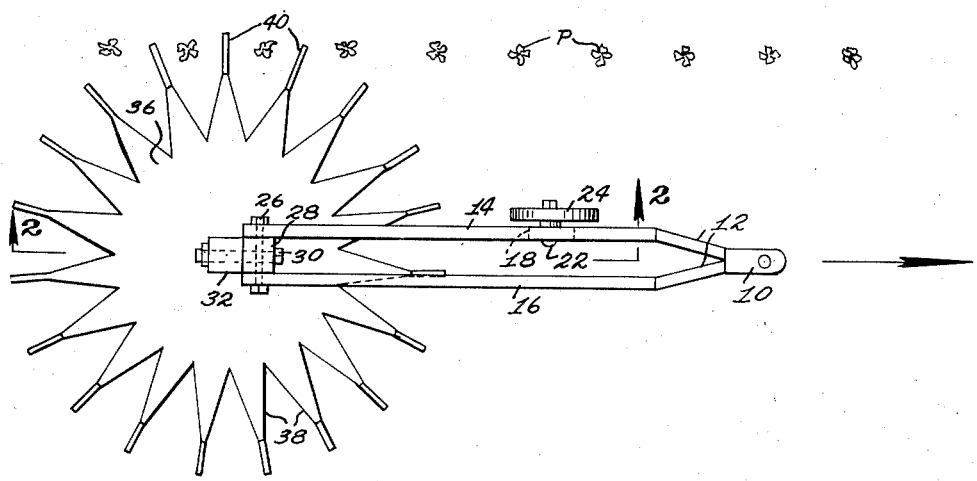
Figure 1 is a top plan view of a weeding implement formed in accordance with the present invention, as it appears while being drawn along a pair of adjacent rows.

Referring to the drawing in detail, the invention includes a clevis 10 adapted to be attached to the draw bar, not shown, of a tractor or similar vehicle, also not shown. The clevis 10 is of conventional construction, and it will be understood that said clevis is so formed as to be attachable to any of the various makes of tractors.

In any event, the clevis 10 is rigid with the upper ends of a pair of inclined, upwardly converging, rigidly connected arms 12. At their lower ends, the respective arms 12 are rigid with horizontally disposed, parallel side rails 14, 16. The side rails 14, 16 are of elongated formation, and one or both of said side rails supports a depth regulating means. In the present instance, the rail 14 supports said means, and accordingly is integrally formed with a depending bearing plate 18, (see Figure 2) having a vertical slot 20 formed therein. An axle 22 extends through said slot 20, and projects laterally beyond the side rail 14, said axle supporting a rotatable ground-engaging wheel 24. The wheel 24 not only permits the entire device to have rollable movement over the ground surface G, but also, is adapted to constitute a depth regulator. This will be readily seen, by reason of the adjustable positioning of the axle 22 within the slot 20. In other words, the axle 22 can be adjusted upwardly or downwardly within said slot, and can be tightened in any selected position to which it is adjusted. This will adjust the elevation of the supporting frame of the device from the ground, said supporting frame comprising the side rails, the arms 12, and the clevis 10.

At their rear ends, the side rails 14, 16 are formed with transversely aligned openings through which is extended a horizontally disposed pivot pin 26, which may be a bolt or its equivalent. The pivot pin 26 extends between the rails 14, 16, and supports for pivotal movement in a vertical plane a block 28.

Figure 2:
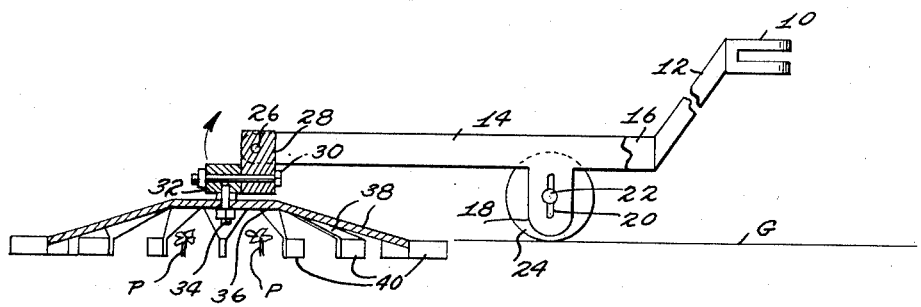
Figure 2 is a longitudinal sectional view taken substantially on line 2—2 of Figure 1.
Figure 3:
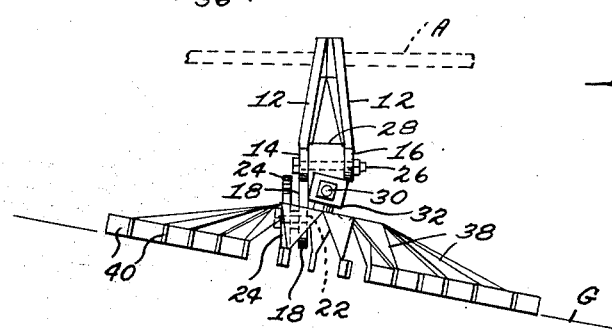
Figure 3 is an end elevational view, taken from the left of Figure 2, the rotatable body of the device being adjusted to a laterally tilted position to conform to the inclination of the ground surface.

The block 28 depends from the side rails, as may be readily seen from Figure 2, and the depending lower portion of the block is provided with a transversely disposed bore, through which is extended a second pivot pin 30, that is arranged in perpendicular relation to the first pivot pin 26.

The second pivot pin 30 projects rearwardly from the block 28, and the projecting portion of said second pivot pin receives a second block 32. Thus, the second block 32 is pivoted for swinging movement in a vertical plane normal to the plane of pivotal movement of the first block 28. In other words, the block 32 pivots bodily with the block 28, when the block 28 pivots in a vertical plane aligned with the direction of movement of the supporting frame, said direction of movement being illustrated by the arrow in Figure 1. At the same time, the block 32 can be swung pivotally independently of the block 28, in selected planes normal to the plane of swinging movement of said block 28.

Secured to the underside of the block 32, and extending downwardly from said block, is a hub 34, on which is freely rotatable a disc 36 formed of sheet metal or similar material. The disc 36 is integrally formed with a plurality of radial outwardly tapered projections 38, said projections being inclined downwardly from the plane of the disc 36, as may be readily noted from Figure 2.

Rigid with the outer ends of the downwardly inclined radial projections 38 are lugs or teeth 40, and as may be noted, the several lugs 40 are disposed in planes normal to the plane of the disc, and are of rectangular formation.

It is important to consider further the particular construction of the rotary weeding tool, from the standpoint both of the ease of manufacture thereof, and the particular adaptability of the tool as a freely rotating element capable of effective use in weeding between row plants. Thus, it is seen that the tool, in being fashioned from sheet metal material, includes a planiform disc 36, the radial projections 38 being formed integrally upon the periphery of said disc. Said projections depend from the disc and are themselves of planiform characteristics, as will be readily noted from Fig. 2. Each projection lies in a plane inclined slightly out of the plane of the disc. The rectangular lug 40 rigid with the pointed outer ends of the projections are also planiform, as will be noted from Fig. 1, with each lug lying in a plane normal to the plane of the disc. The lugs have lower edges lying in a common plane (see Fig. 2) paralleling the plane of the disc, with each lug being rigidly connected to its associated radial projection at the upper, inner corner portion of the lug.

It has been found that this construction is particularly effective in weeding between plants P of a row.

In use, the depth to which the ground surface G is to be penetrated is predetermined by the adjustment of the wheel 24 upwardly or downwardly relative to the supporting frame of the device. Thereafter, the device is attached to the draw bar of a tractor, and is disposed between parallel rows of a row crop, the lugs 40 projecting between the plants P of the row. The blocks 28 and 32 are adjusted relative to the frame and to one another to dispose the rotatable ground-engaging body of the device at a selected angle of inclination, said rotatable body being tiltably adjusted either laterally or longitudinally of the device, or both laterally and longitudinally of the device. After these adjustments have been made, the bolts 26, 30 are tightened to retain the blocks in the selected positions to which they are adjusted.

The device is then drawn along parallel to the rows, the body of the device comprising the disc 36, projections 38, and lugs 40 freely rotating as a unit.

It has been found that the construction is particularly effective in weeding between the plants P of a single row, and also in weeding or cultivating the ground area between the rows themselves.

It is believed clear that the invention is not necessarily confined to the specific use or uses thereof, described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claim.

What is claimed is:

A rotary weeding tool comprising a planiform disc having means at its center to mount the same for free rotation upon a spindle, a series of planiform, radial projections depending from and formed integrally with the periphery of said disc, each of said projections lying in a plane inclined slightly out of the plane of the disc with each projection tapering to a point in a direction away from the disc, and planiform, rectangular lugs depending from and integral with the pointed ends of said projections, each lug extending radially and outwardly of the disc in a plane normal to the plane of the disc, said lugs having lower edges lying in a common plane paralleling the plane of the disc, each lug being integrally connected to a radial projection at the upper, inner corner portion of the lug.

References Cited in the file of this patent

UNITED STATES PATENTS

| | | |
|---|---|---|
| 75,578 | Roberts | Mar. 17, 1868 |
| 1,610,587 | Randolph et al. | Dec. 14, 1926 |
| 2,061,694 | Cuddigan | Nov. 24, 1936 |
| 2,215,364 | Simmons et al. | Sept. 17, 1940 |
| 2,388,689 | Hebert | Nov. 13, 1945 |
| 2,393,190 | Ritenour | Jan. 15, 1946 |
| 2,529,417 | Pitre | Nov. 7, 1950 |
| 2,596,527 | Bushong | May 13, 1952 |